H. A. HOESCHEN.
RAILWAY SIGNAL MECHANISM.
APPLICATION FILED DEC. 13, 1911.

1,170,156.

Patented Feb. 1, 1916.
7 SHEETS—SHEET 1.

Inventor,
Henry A. Hoeschen.

Witnesses:
J. E. Titus
Geo. L. Williamson

By David O. Barnell,
Attorney.

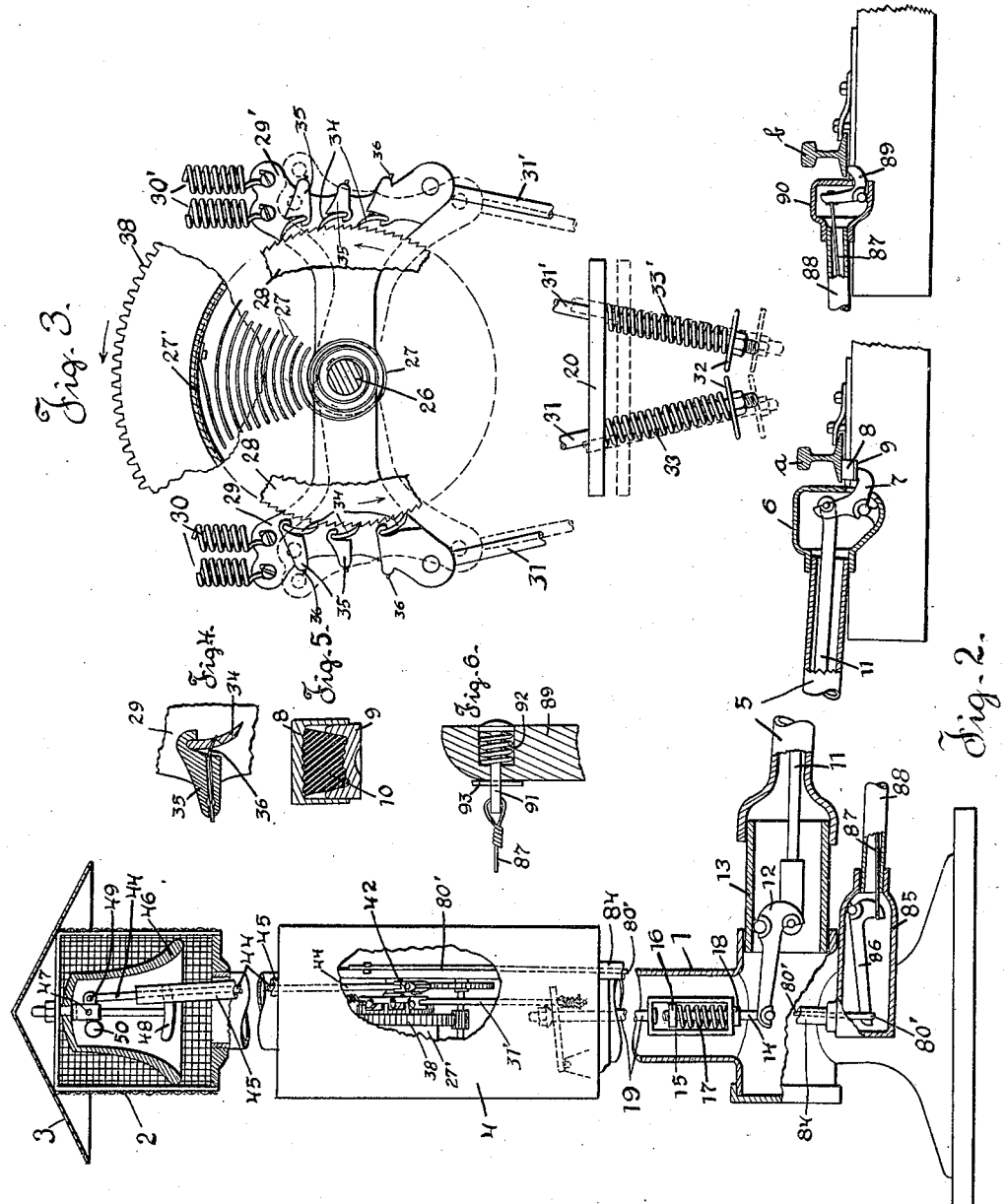

H. A. HOESCHEN.
RAILWAY SIGNAL MECHANISM.
APPLICATION FILED DEC. 13, 1911.

1,170,156.

Patented Feb. 1, 1916.
7 SHEETS—SHEET 4.

Witnesses:

Inventor,
Henry A. Hoeschen,
By David O. Barnell,
Attorney.

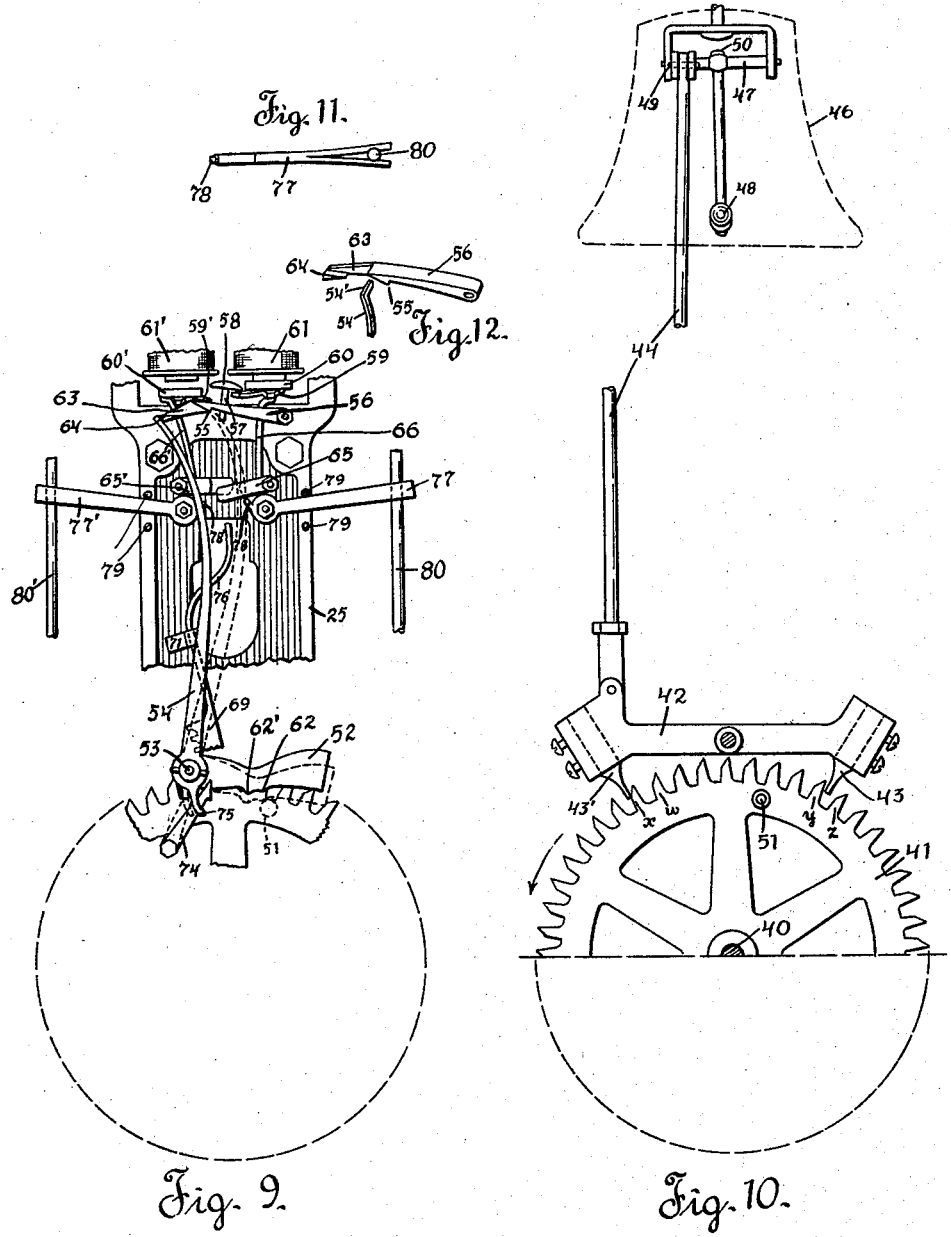

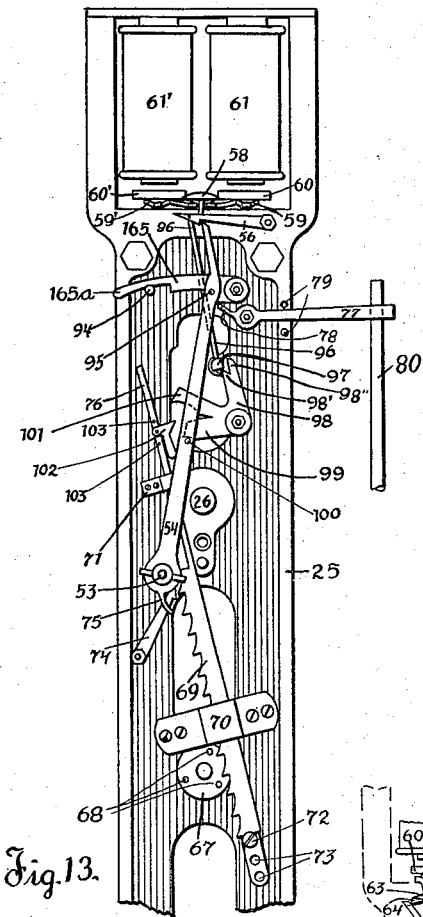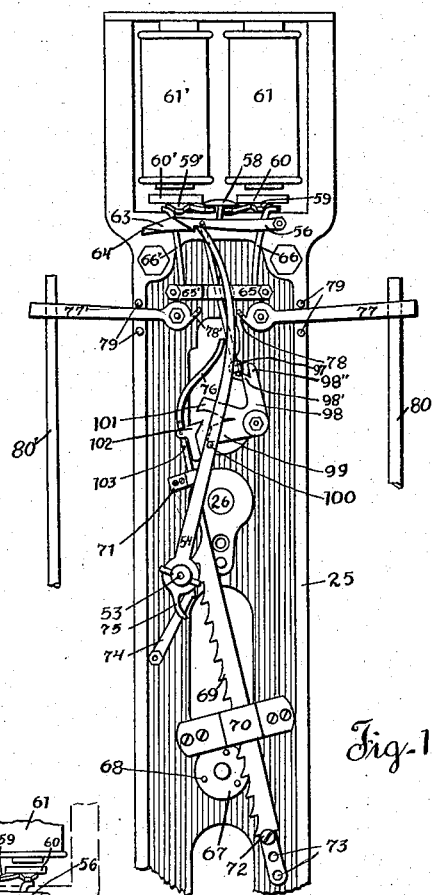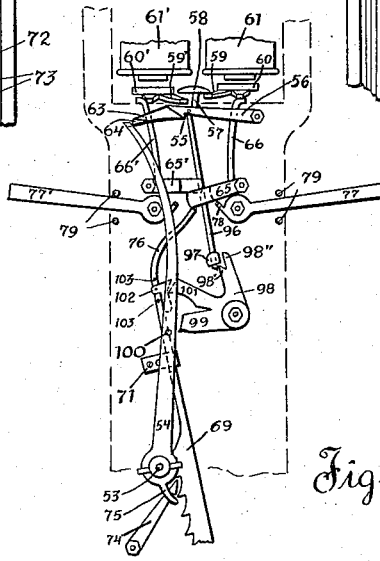

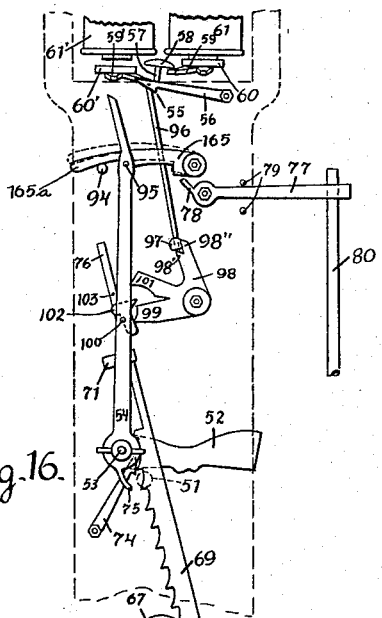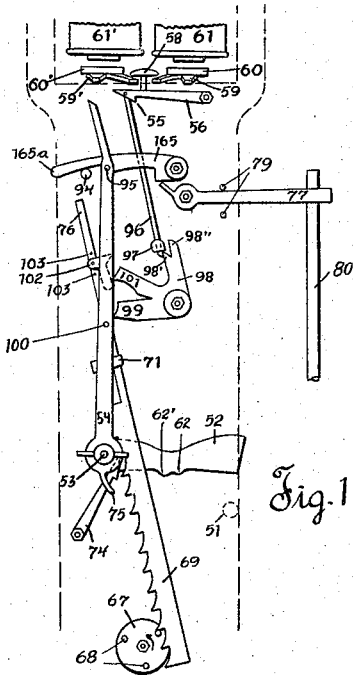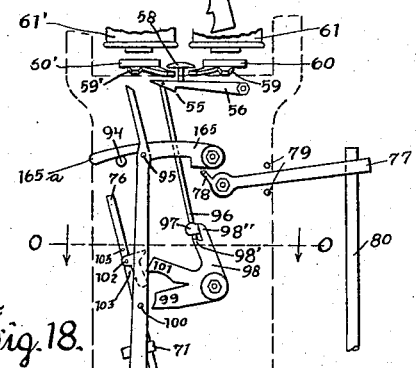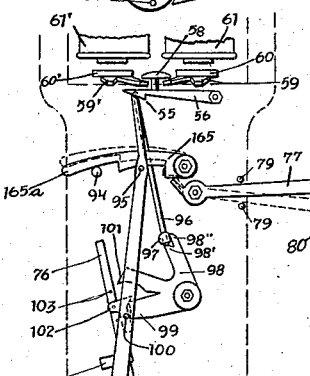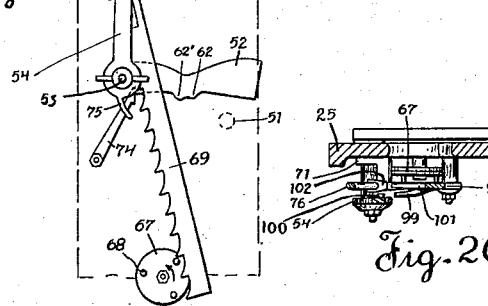

UNITED STATES PATENT OFFICE.

HENRY A. HOESCHEN, OF OMAHA, NEBRASKA, ASSIGNOR TO HOESCHEN MANUFACTURING COMPANY, OF OMAHA, NEBRASKA, A CORPORATION OF NEBRASKA.

RAILWAY SIGNAL MECHANISM.

1,170,156.      Specification of Letters Patent.      Patented Feb. 1, 1916.

Application filed December 13, 1911. Serial No. 665,575.

*To all whom it may concern:*

Be it known that I, HENRY A. HOESCHEN, a citizen of the United States, and a resident of Omaha, in the county of Douglas and State of Nebraska, have invented certain new and useful Improvements in Railway Signal Mechanism, of which the following is a specification.

My invention relates to railway signaling mechanism and more especially to mechanism for signaling at a railway crossing the approach of trains to said crossing.

It is the object of my invention to provide in a signal of this class means by which the energy for the operation of the signal is derived from the movement of the track during the passage of a train over it; means for preventing overwinding of the mechanical energy-storing device; means for preventing conveyance of unnecessary vibration or concussion from the track to the signal mechanism; means for controlling the stopping and starting of the signal from one or more tracks; means for timing the duration of operation of the signal whereby after a predetermined maximum period of operation the signal will be automatically stopped; means for preventing the stopping of the signal when, after the passage of a train, another follows it within a predetermined time; and combined means for striking a bell and controlling the speed of operation of the actuating means.

Constructions embodying my invention are illustrated in the accompanying drawings, in which—

Figure 1:
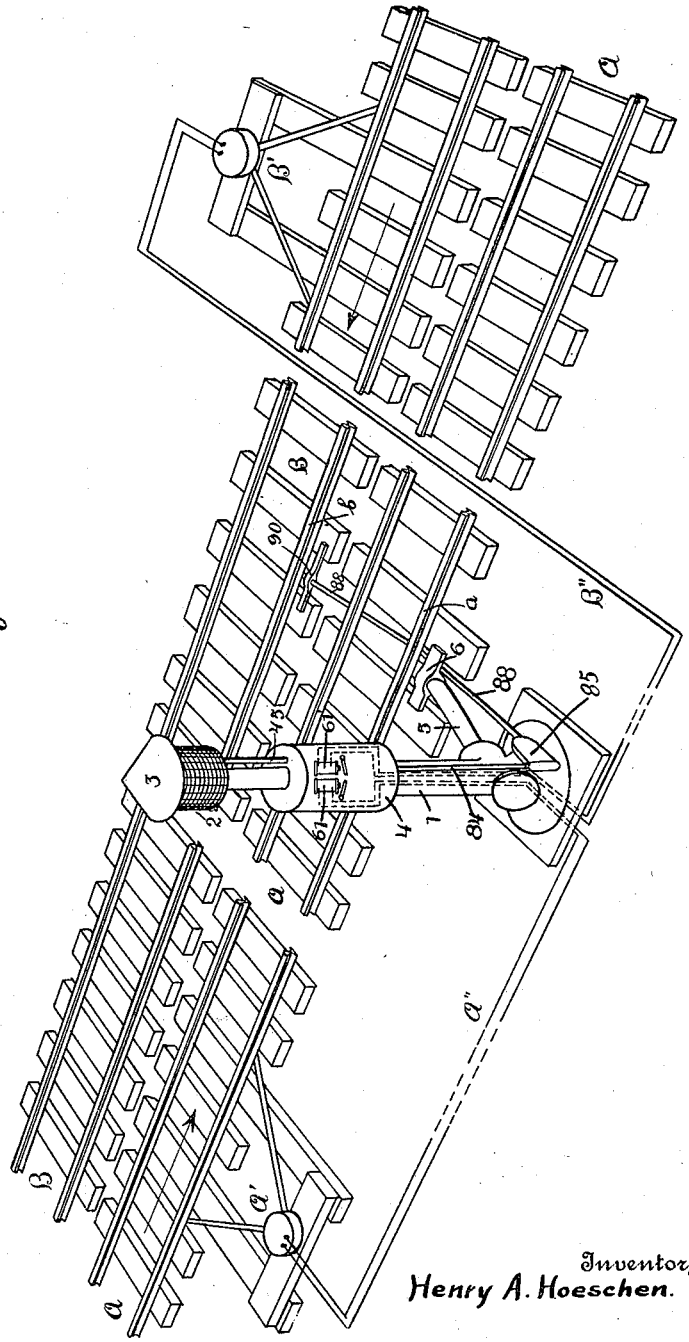
Figure 7:
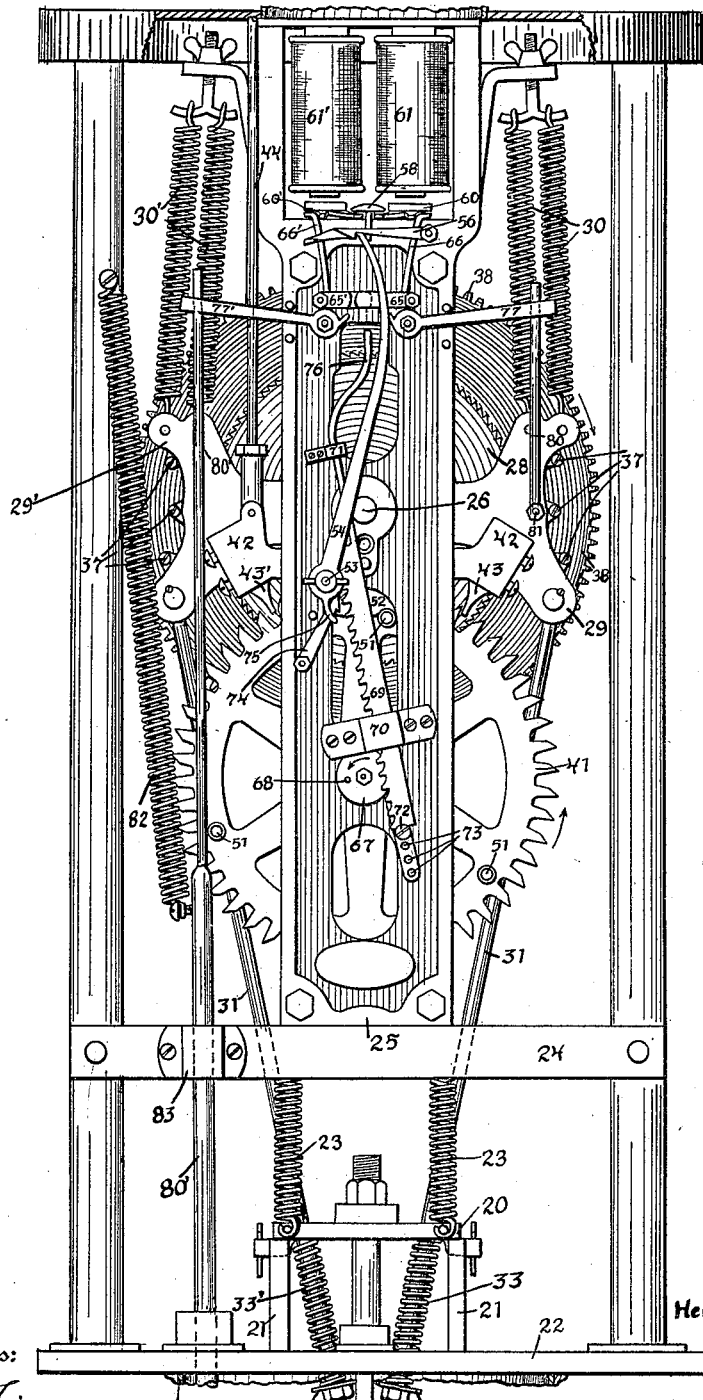
Figure 8:
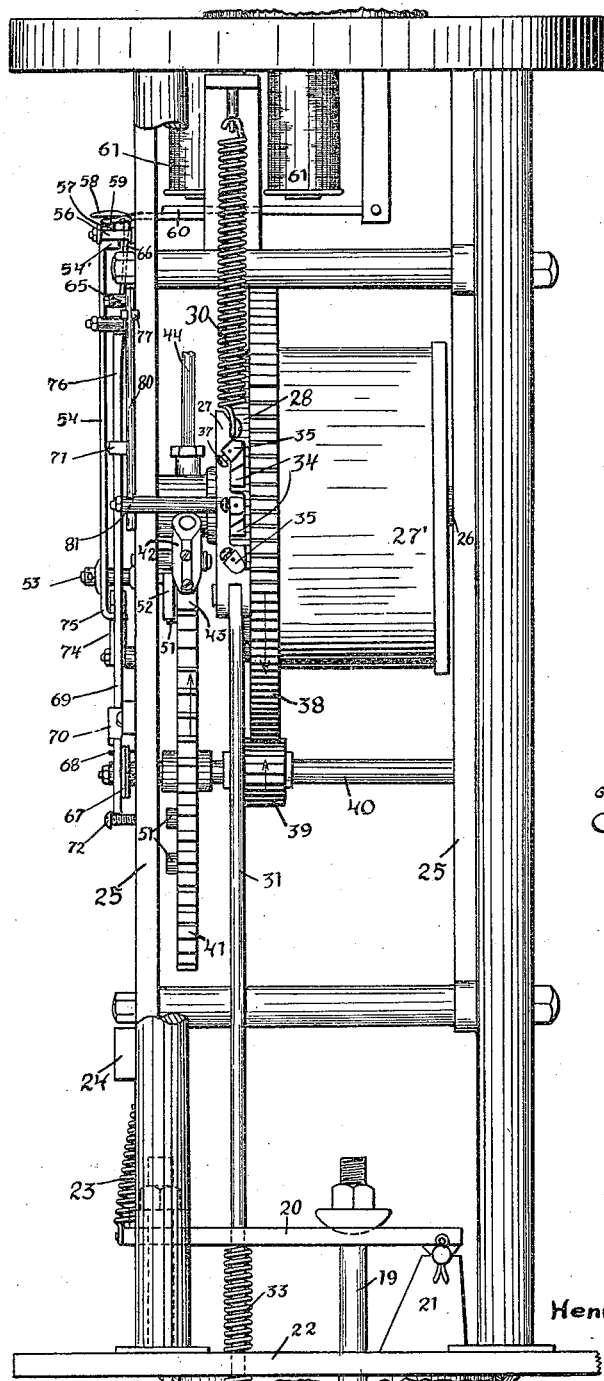

Figure 1 is a perspective view showing the general arrangement of my signal mechanism as applied to a crossing-signal for double-track railway where the trains on each track move in one direction only, Fig. 2 is an elevation of the signaling instrument and its track connections, parts being in section, and portions of the connecting members being broken away, Fig. 3 is a detail of portions of the motor and the motor-winding devices, Fig. 4 is a detail section of one of the pawls of the motor-winding device, Fig. 5 is a detail section of the concussion-pad for the rail-lever of the winding device, Fig. 6 is a detail section of the cushioning device in the second-track control connection, Fig. 7 is a front elevation of the motor and control mechanism for double-track, without follow-up lockout, Fig. 8 is a side elevation of the same, Fig. 9 is a detail elevation showing the operation of the control mechanism, Fig. 10 is a detail of the escapement mechanism and its connection with the signal bell, Fig. 11 is a detail plan of the lift-bar and rod frictional connection, Fig. 12 is a perspective view of the detent-bar and a portion of the stop-arm, Fig. 13 is a detail of the control mechanism for a single-track installation with follow-up lockout, Fig. 14 is a similar view of the control mechanism for a double-track installation with follow-up lockout, Fig. 15 is a view illustrating the operation of the latter control mechanism, Figs. 16, 17, 18 and 19 are views illustrating the operation of the control mechanism of the single-track installation with follow-up lockout, and Fig. 20 is a detail horizontal sectional view of the lockout-lever and its connections, the section being on the plane of the line *o—o* of Fig. 18.

In the illustrated embodiment of my invention the signal operated by the mechanism is a bell which is arranged at the intersection of the railway and a public highway or at any other place along the railway track at which it may be desired to operate a signal to indicate the approach of trains. The bell is supported by a tubular post or column 1 which rests upon a suitable base or foundation, the bell being carried at the top of the column, inclosed by a cage 2 of wire fabric or perforated metal and covered by a hood 3. At an intermediate part of the column is disposed a casing 4, inclosing the motor and motor control mechanism. Referring to Fig. 1 of the drawings, there is represented portions of a double-track railway at and upon each side of the place at which the signal mechanism is located. In the arrangement illustrated it is assumed that upon each track the trains will be run in one direction only, namely, in the direction of the arrows on the respective tracks A and B. Suitable track instruments A' and B', preferably of the type shown in Letters Patent No. 914,412, issued to me March 14, 1909, are placed upon the respective tracks at suitable distances from the signal mechanism in the directions from which trains approach the same on the respective tracks, and the track instruments are electrically connected by wires A" and B" with the release-magnets of the control mechanism at the signal. The arrangement of track instruments and releasing circuits shown in Fig. 1 is intended merely to show a typical arrangement of the mechanism, and it will be apparent to those skilled in the art that, by suitable arrangements of track instruments and circuits, the release-magnets of the signal mechanism may be operated by trains approaching the signal mechanism from either direction and on one, two more tracks.

The power for the actuation of the signal mechanism is derived from the movements of the rails of the track adjoining the signal, during the passage of trains over the said track, and the means by which such movements are utilized are similar to those shown in Letters Patent No. 600,420, issued to me March 8, 1898. I have, however, made certain improvements in the structural details of said mechanism and will, therefore, describe the same in detail.

From the base portion of the column 1 which supports the signal mechanism, a tubular casing 5 is extended laterally to a point adjoining the nearest rail $a$ of the track A, and is connected with a hollow head 6 which is secured to the ties. Within the head 6 is fulcrumed a bell-crank 7 of which one arm extends through a slot in the head and beneath the base-flange of the rail $a$. Between said arm of the bell-crank and the rail-flange is disposed a concussion-pad or cushioning device comprising an inverted cup-shaped body 8, a second cup-body 9 fitting slidably within the first, and a body 10 of resilient material such as rubber, inclosed between the cups. The lower cup-body has a rounded recess in its under side into which the end of the bell-crank arm extends sufficiently to prevent displacement of the concussion-pad while it is held against the rail. The other arm of the bell-crank 7 extends upwardly within the head 6 and from the upper end thereof a rod 11 extends through the casing 5 and connects with the downwardly extending arm of a bell-crank 12. The bell-crank 12 is fulcrumed within a sleeve 13 which forms a connection between the casing 5 and the column 1. One arm of the bell-crank 12 extends in horizontally to about the center of the column 1 and is connected with a rod 14 which extends upwardly within the column. The rod 14 passes slidably through the lower side of a stirrup 15 and at its upper end has screwed thereon an adjusting-nut 16 between which and the bottom of the stirrup is disposed a coil spring 17. On the rod 14 below the stirrup is a stop-collar 18 which engages the stirrup and holds the spring 17 under a constant compression which may be varied by means of the nut 16. From the upper end of the stirrup a rod 19 extends up through the column and passes through the plate-lever 20, being provided at its upper end with a nut and a ball-washer which bears upon said lever. The plate-lever is fulcrumed at its rearward end on posts 21 extending up from the base-plate 22 of the motor-frame, and the front end of the plate-lever is yieldably sustained by the springs 23 which connect the plate with the cross-bar 24 of the motor-frame. It may be noted that the springs 23 serve to hold under a constant tension the connecting parts between the plate-lever and the bell-crank 7, and thus cause the bell-crank to retain the concussion-pad in engagement with the rail.

In the side-plates 25 of the motor-frame is journaled the motor-shaft 26 to which is connected the inner end of the motor-spring 27, as shown in Fig. 3. The outer end of the motor-spring is connected with a drum 27' by which the spring is inclosed. Secured to the shaft 26 is a ratchet-wheel 28 and adjoining the ratchet-wheel there is pivotally mounted on the shaft the pawl-plates 29 and 29'. To the respective pawl-plates are connected coil-springs 30 and 30' which extend upwardly and are adjustably connected with the frame, as shown. Connected to the lower portions of the respective pawl-plates are rods 31 and 31' which extend downwardly and pass through the plate-lever 20. At the lower ends of the said rods are adjusting-nuts and washers 32 between which and the plate-lever coil-springs 33 and 33' are disposed around the respective rods.

The rail $a$ is arranged so as to lie normally slightly above the ties on which the head 6 is secured. Upon the passage over the railway track of a load sufficient to depress the rail, the downward movement thereof is communicated through the concussion-pad to the bell-crank 7, the movement of said bell-crank is communicated through the rod 11 to the bell-crank 12, from the bell-crank 12 through the rod 14 to the spring 17, from said spring to the stirrup 15, thence through the rod 19 to the plate-lever 20, and thence through the springs 33 and 33' and the rods 31 and 31' to the pawl-plates. The pawl-plates are each provided with a plurality of pawls 34 adapted to engage the teeth of the ratchet-wheel 28, the pawls carried by the plate 29 advancing the ratchet-wheel during the downward movement of the plate, and the pawls carried by the plate 29' advancing the ratchet-wheel during the upward movement of the plate.

It will be apparent that as the wheels of a train pass over the rail $a$ and the same is alternately depressed and permitted to rise to its normal position, the movement thereof will cause, through the connections described, an oscillating movement of the pawl-plates which will advance the ratchet-wheel 28, turn the motor-shaft 26 and wind up the motor-spring.

The purpose of the various resilient members in the connecting mechanism from the rail to the pawl-plates is to protect the motor spring from over-winding and to protect the metallic members from sudden hammer-like blows and shocks which, in the course of time, would cause crystallization and weakening of the metal which might result in fractures thereof. The first of these protective devices is the concussion-pad comprising the cups 8 and 9 and the block 10 of resilient material inclosed thereby. The function of this device is to modify the sudden movements of the rail and prevent crystallization of the connecting parts beyond said device. The second protective device is the spring 17 which is interposed in the column-rod at the stirrup 15. This spring is normally held under such a pressure that it will not be materially compressed except when the motor-spring is excessively overwound. It serves, however, to modify the suddenness of movement of the connecting parts beyond it and thus to lessen the probability of them becoming crystallized. The said spring 17 also serves as an ultimate control or safety device to protect the motor spring from over-winding in the event of the failure of the other protective devices so to do.

The direct control or protection from over-winding of the motor spring lies in the springs 30 and 30′ and the springs 33 and 33′. Ignoring for the present the action of the springs 33 and 33′, and considering the rods 31 and 31′ to be positively actuated by the plate-lever 20, the action may be stated as follows: When the rods 31 and 31′ are pulled downwardly the pawls on the plate 29′ move backwardly with respect to the ratchet-teeth and the wheel is advanced by the pawls on the plate 29. If the motor spring is below its normal tension, the ratchet-wheel is further advanced by the pawls on the plate 29′ during the upward movement of the pawl-plates, the tension of the springs 30′ at their minimum elongation being made such as to substantially balance the tension of the motor spring, as communicated through the ratchet-wheel and plate 29′, when the motor spring is at the minimum tension at which it is desired to operate the same. As soon as the tension of the motor spring begins to exceed the said minimum, which is to say after the winding thereof has proceeded for a certain time, then a greater elongation of the springs 30′ is necessary before the pull of said springs on the plate 29′ is sufficient to balance the counter-pull of the motor-spring. When this condition is reached, then during the upward movement of the pawl-plate 29 the ratchet-wheel will move backwardly and the pawl-plate 29′ will be pulled downward until the tension of the springs 30′ balances the pull of the motor spring. When, in order to reach such a tension of the springs 30′, the elongation thereof is equal to the amount of movement of the plate-lever 20, then no further winding action upon the motor spring will occur during the upward movement of the plate-lever 20, because during such upward movement the pull of the motor spring upon the plate 29′ will be sufficient to maintain the springs 30′ at an elongation such that no upward movement of the rod 31′ and plate 29′ will occur. The winding action will be continued, however, during the downward movements of the plate-lever 20, the action being as follows: At the beginning of the downward movement the ratchet-wheel 28 is moved forwardly by the engagement therewith of the pawls on the plate 29. The pull of the motor spring against the springs 30′ is thus relieved so that the plate 29′ will move upward until the down-stroke of the plate-lever is approximately half completed. The plate 29′ will then be moved downward because at the half-stroke the plate-lever 20 will begin to pull upon the rod 31′. Then during the upward movement of the plate-lever 20 the plate 29 will make a full upward stroke, its pawls moving backwardly over the ratchet-teeth while the ratchet-wheel is held stationary by the engagement therewith of the pawls on the plate 29′. Thus it will be seen that only half of the maximum possible winding action will take place when the tension of the motor spring has become such as to cause an elongation of the springs 30′ equal to the movement of the plate-lever 20, the winding action having been gradually reduced as the tension of the motor-spring increased. At a time somewhat before the above described condition is reached, the winding action begins to be directly modified by the spring 33, it being understood that the springs 33 and 33′ are of such strength that for a time after the winding action is commenced they will not be materially compressed in transmitting to the rods 31 and 31′ the downward movements of the plate-lever 20. When the tension of the motor spring becomes great enough, however, then the downward pull of the plate-lever 20 will begin to compress the spring 33 so that the full movement of the plate-lever will not be communicated to the rod 31. As the tension of the motor spring continues to increase, the compression of the spring 33 will become greater and greater and the movement of the rod 31 and plate 29 less and less, until at last the tension of the motor spring will be sufficient to compress the spring 33 by an amount equal to the movement of the plate-lever 20. The winding action will then cease entirely until the tension of the motor spring is reduced by its use in actuating the signal mechanism.

It may be noted that on each of the plates 29 and 29' there are a plurality of the pawls 34 which are spaced in a vernier-like relation to the teeth of the ratchet-wheel. In Fig. 3 there are shown three of the pawls on each plate and it will be noticed that while one of the pawls engages the radial face of a tooth, the other two are, respectively, one-third and two-thirds of the length of a tooth distant from the radial faces of the teeth which they engage. Thus, movements of the pawl-plates so slight as to equal only one-third the length of one of the ratchet-teeth may be communicated to the wheel. In Figs. 3 and 4 is shown a convenient and inexpensive manner of mounting the pawls on the plates. On the rearward sides of the pawl-plates are lugs 35 of which the portions adjoining the ratchet-wheel are in the form of hooks, as shown. The pawls are made from flat pieces of metal bent to a slightly curved form and having one end rounded so as to fit into the hooks of the lugs 35. At about the center of each pawl a conical opening is made therein and into said opening is extended the end of a spring 36, which is preferably formed by several pieces of small spring-wire. The spring is extended back through a hole drilled in the lug 35, as shown in Fig. 4, and is retained in said hole by means of a small set-screw 37 screwed into the lug from the front side of the pawl-plate. By the said arrangement of springs the same serve both to retain the rounded ends of the pawls in the hooks of the lugs, and also to press the pawls yieldably into engagement with the ratchet-teeth.

Revolubly mounted on the motor-shaft 26 is a gear 38 to which is secured the drum 27' with which, as before mentioned, is connected the outer end of the spiral motor spring 27. The gear 38 meshes with a pinion 39 which is secured on a shaft 40 journaled in the frame-plates 25. On the shaft 40 is secured the escape-wheel 41 and above said wheel the verge-beam 42 is pivotally mounted on a stud extending back from the front frame-plate. Adjustably secured in the ends of the verge-beam are the pallets 43 and 43' which are arranged so as to be alternately engaged by the teeth of the escape-wheel, which will thus impart an oscillatory movement to the verge-beam. At one end of the verge-beam a rod 44 is connected therewith and extends upwardly through the top of the casing 4, thence through a small inclosing pipe 45 which passes up into the bell-cage 2 and terminates inside the bell 46, as shown in Fig. 2. The bell 46 is held stationary and within the same near the top thereof is pivoted a shaft 47 which carries the swinging hammer 48. A short crank 49 is also carried on the shaft 47 and to said crank is connected the upper end of the rod 44, while opposite the crank is a counterweight 50 which serves to balance the weight of the rod. By the connections described the swinging hammer serves as a pendulum to control the rate of oscillation of the verge-beam and, consequently, the speed of rotation of the escape-wheel 41. The parts are so proportioned that at the end of each swing of the pendulum-hammer the same will strike and sound the bell, and, for convenience in calculating the time-durations of signal operations it is preferred to arrange and proportion the parts so that there will be two strokes of the bell per second, which corresponds to an advance of the escape-wheel of one tooth per second.

On the front side of the rim of the escape-wheel small rollers 51 are mounted and, normally, rotation of the wheel is prevented by the engagement of one of these rollers with the stop-block 52. One end of the stop-block is secured to the inner end of a shaft 53 which is revolubly mounted in the front frame-plate. On the front end of the shaft 53 is secured the stop-arm 54 which extends upwardly therefrom and normally engages the hook portion 55 of the pivoted detent-bar 56. Extending upwardly from the detent-bar is a pin 57 provided with a head 58 beneath which are extended the lifting-fingers 59 and 59' carried respectively by the armature 60 and 60' of the release-magnets 61 and 61'. The said magnets are those which are connected by the line-wires A'' and B'' with the track instruments A' and B' as hereinbefore mentioned.

The stop-block 52 is provided at its lower side with two adjoining rounded projections 62 and 62', the first of which normally lies partially in the path of the rollers 51 and thereby prevents rotation of the escape-wheel until the stop-arm is released from the detent-bar 56. When the stop-arm is released from the detent-bar 56 the pressure of the roller 51 engaging the projection 62 raises the stop-block, and the roller then passes the projection 62 and strikes the second projection 62', the latter being slightly higher than the first so that upon engagement of the roller therewith the block will be raised somewhat higher than at first.

The purpose of arranging the projections 62 and 62' in the particular manner described may be understood by reference to Figs. 9 and 10. The verge-beam and the pallets 43 and 43', the teeth of the escape-wheel, the rollers 51 and the projecting portions of the stop-block are so arranged relatively to each other that when the escape-wheel is brought to rest by the engagement of one of the rollers 51 with the projection 62 of the stop-block, as shown by dotted lines in Fig. 9, the pallets and the teeth of the escape-wheel will be in the positions shown in Fig. 10. In an escapement mechanism the movement of the wheel is not uniform and the wheel advances by a series of sudden movements alternating with periods of slower movement or even of absolute rest. Thus, in the escapement device as shown in Fig. 10, when the pallet 43' is engaged by the beveled face of the tooth *x* and the said pallet is raised, the movement of the wheel is relatively slow until the tooth passes out of engagement with the pallet. The pallet 43 meanwhile having passed down between the teeth *y* and *z*, as the pallet 43' becomes disengaged from the tooth *x* the wheel moves forward rapidly until the pallet 43 is engaged by the tooth *z*, whereupon the movement of the wheel is checked and for an appreciable time it remains almost stationary. Then it commences moving forward slowly as the pallet 43 passes up the beveled face of the tooth *z* and again moves forward suddenly as the said pallet passes out of engagement with the tooth and before the tooth *w* engages the pallet 43'. Now, when the wheel and pallets are in the position shown in Fig. 10, the rapid movement of the wheel will have been checked by the engagement of the tooth *x* with the pallet 43', and the wheel will be just commencing the slow forward movement which occurs while the said pallet passes up the beveled face of said tooth. Thus, by arranging the parts so that the roller engages the stop-projection 62 at this instant the wheel may be brought to rest without jar or shock and without throwing any excessive stresses upon the stop-block, the shaft 53, the stop-arm or the detent-bar 56. Similarly, when the stop-arm is released, the stop-block is raised gently while the pallet 43' is passing up the face of the tooth *x*; then at the same instant that the tooth leaves the said pallet the roller 51 reaches the crest of the projection 62, and during the rapid movement of the wheel the roller passes across the space between the projections 62 and 62'. Then, during the slow movement of the wheel as the pallet 43 passes up the face of the tooth *z*, the roller engages the projection 62' and the additional movement of the stop-block is thereby caused gently and without shock. It will be obvious that after the release of the stop-arm the movement of the escape-wheel will continue until the stop-arm is returned to engagement with the detent-bar so as to hold the stop-block in its lowered position, after which, as the next one of the rollers 51 reaches the stop-block, the movement of the escape-wheel will be stopped. In order to prevent the immediate return of the stop-arm to engagement with the hook 55 of the detent-bar, the latter may be provided with a finger 63 extending beyond the hook portion 55 and carrying at its end a wedge-shaped lug 64. The upper end of the stop-arm has a laterally extending finger 54', as shown in Fig. 12, adapted for engagement with both the hook portion 55 and the flat end of the lug 64 of the detent-bar. Now, when the detent-bar is raised by the movement of the armature of one of the release-magnets, the upper end of the stop-arm is swung out slightly beyond the lug 64, being actuated by the raising of the stop-block. As the impulses transmitted to the release-magnets from the track instruments A' and B' are of only momentary duration, the armatures after being lifted by such impulses immediately drop down again to the semi-raised position shown in Fig. 9 at which the lug 64 of the detent-bar may be engaged by the finger 54' and the stop-arm thus retained in the signal-releasing position thereof shown in the said Fig. 9. While the stop-arm is in this position the stop-block is held in a raised position and will be lifted only slightly by the rollers 51 in passing the same, its movement each time one of the rollers passes it causing the stop-arm to move slightly beyond the lug 64. In order to retain the detent-bar in the semi-raised position described, the drop-levers 65 and 65' are provided, the same being pivoted on the frame below the detent-bar and having upwardly extending arms 66 and 66', the latter passing behind the detent-bar and normally extending alongside of and slightly above the respective lifting-fingers 59 and 59'. When one of the release-magnet armatures is lifted the respective drop-lever swings downward and the arm carried thereby passes in under the lifting-finger carried by said armature, so that after the armature is released from the magnet it is held, and in turn holds, the detent-bar in the semi-raised position described. In Fig. 9 the drop-lever 65, arm 66, and lifting-finger 59 are shown as holding the detent-bar in semi-raised position so that the stop-arm is retained thereby in the signal-releasing position. After the parts are in this position the movement of the escape-wheel, and consequently the ringing of the bell, will continue until the stop-mechanism is restored to normal or motor-stopping position.

Two distinct means are provided for lifting the drop-levers to drop the detent-bar from the semi-raised position and free the stop-arm from the signal-releasing position. The first of these means may be designated as the timing or motor-controlled signal-stopping mechanism, and the second means as the train-controlled signal-stopping mechanism. The former mechanism is constructed as follows: On the front end of the shaft 40 which carries the escape-wheel is a disk 67 on the face of which are one or more pins 68. Adjoining the disk is a rack-bar 69 which is slidably held in a slightly inclined position by means of guides 70 and 71, as shown. One edge of the rack-bar is provided with teeth adapted to be engaged by the pins 68 to intermittently lift the bar. The lower end of the bar normally rests upon a screw 72 which may be placed in any one of a series of holes 73 made in the frame, the relation of the rack-bar and pin-disk being thus varied so that a greater or less number of turns of the shaft 40 will be required to lift the rack-bar to a position at which it will engage the drop-levers. A pawl 74 is pivoted on the frame below the shaft 53 and extends up toward the rack-bar and adjacent to the lower end of the stop-arm 54. The stop-arm carries at its lower end a tail-piece 75 which, when the stop is in normal position, holds the pawl out of engagement with the rack-bar. When the stop is in signal-releasing position, however, the pawl is permitted to fall into engagement with the rack-bar so as to retain the same in the successive positions to which it is lifted by the pins 68. The upper end of the rack-bar carries a rod 76 which extends up beneath the adjoining ends of the drop-levers 65 and 65' so that after the rack-bar has been lifted to a sufficient extent the said rod will engage the drop-levers and restore them to normal position. It will be noted that the adjoining portions of the drop-levers overlap each other so that either or both of them may be lifted by the means described. When the drop-levers are lifted the detent-bar is permitted to drop to normal position so that the lug 64 is below the finger 54' of the stop-arm and said finger can then pass back between the lug 64 and hook 55. The stop-arm is thus freed from the signal-releasing position and returns to its normal position so as to stop the action of the signal mechanism, its movement to normal position being caused by the weight of the stop-block which, when not raised by the rollers 51, always tends to reset the stop to normal position. At the same time that the stop returns to normal position the tail-piece 75 lifts the pawl 74 out of engagement with the rack-bar 69 so that the same falls back to its lower or normal position and rests upon the screw 72. It may be noted that the pins 68 are so located with reference to the rollers 51, both being held in fixed relation to each other on account of being secured to the same shaft, that at the stopping positions of the escape-wheel the pins 68 will not engage the rack-bar so as to prevent its dropping back to normal position.

It will be obvious that by the described mechanism the signal after being released will be operated for a predetermined time and will then be automatically stopped and all parts of the mechanism restored or reset to normal position. In the operation of crossing signals, however, it is desirable that the signal, after being released by the approach of a train to the crossing, shall continue in operation only until the train reaches the crossing, and shall then be stopped, since there would be no useful purpose served by having the signal continue to operate after the train had passed and was moving away from the crossing. Now, as trains move at varying speeds it is obviously impossible to have the signal operate in the above manner when its stopping is controlled by timing mechanism alone, yet it is essential that a certain time-limit for the duration of its operation shall be established in order to provide for cases where the signal mechanism might be released by a train which passed the track instrument but which did not continue its movement toward the crossing so as to reach the same within a reasonable time.

In any particular instance there may be determined a standard or normal time within which trains should pass from the track instrument to the crossing at which the signal is placed, and the timing control-mechanism is so adjusted that it will stop the operation of the signal only after a somewhat longer period of time has elapsed than the standard or normal time allowed for trains to reach the crossing after having passed the track instrument. Then as long as the trains move at their usual speed the operation of the signal will be stopped by the train-controlled stopping mechanism which is constructed as follows: Beneath the drop-levers 65 and 65' are pivoted the lift-bars 77 and 77' which are provided with fingers 78 and 78' adapted to engage the respective drop-levers. The lift bars 77 and 77' extend outwardly between pins 79 on the frame, said pins serving to limit movement of the bars. The outer ends of the lift-bars are forked, as shown in detail in Fig. 11, the fork portions being sprung apart and passing around the rods 80 and 80' so as to form a slidable frictional connection therewith. The rod 80 is connected with a stud 81 which extends out from the front side of the pawl-plate 29, so that said rod will be given a vertical reciprocating movement during the movements of said pawl-plate in winding the motor spring. The rod 80' has connected thereto a coil spring 82 which exerts an upward pull thereon. The said rod passes down through a guide 83 and out of the bottom of the motor casing 4. It then extends downwardly through an inclosing tube 84 of which the lower end is connected with a casing 85 arranged at the bottom of the column 1, as shown in Figs. 1 and 2. Within the casing 85 is fulcrumed a bell-crank 86 and the rod 80' is connected with the horizontal arm of said bell-crank. To the depending arm of the bell-crank is connected a wire 87 which extends through a pipe 88 beneath the track A, as shown in Fig. 1, and is connected with the vertical arm of a bell-crank 89. Said bell-crank is fulcrumed in the head 90 which is secured to the ties adjoining the rail $b$ of the track B. It will be understood that one end of the pipe 88 is connected with the head 90 and the other connected with the casing 85 so that the wire is completely inclosed. The lower arm of the bell-crank 89 extends out through a slot in the head 90 and engages the base-flange of the rail $b$, being held in such engagement by the upward pull of the spring 82 on the rod 80'. The rail $b$ is arranged similarly to the rail $a$, or so as to be depressed relatively to the ties by the passage of a train over it. In order to modify the shock due to sudden depression of the rail by trains moving at high speed, I provide a resilient connecting device between the wire 87 and the bell-crank 89, as shown in detail in Fig. 6. The wire is connected with a stem 91 which passes slidably through an opening in the upper arm of the bell-crank. The end of the stem is provided with a head beneath which a coil spring 92 is arranged in a recess made in the arm. A pin 93 passing through the stem, as shown, holds the spring under a constant compression such that it will not yield appreciably under the normal tension upon the wire, but will serve to cushion or modify the sudden movements of the rail so as to prevent undue stresses in the wire and other connecting devices beyond it.

From the foregoing, the operation of the train-controlled signal-stopping mechanism may be understood. A train approaching the signal on the track A causes the track instrument A' to send an electrical impulse over the wires A'' to the release-magnet 61. The movement of the armature permits the falling of the drop-lever 65 and starts the operation of the signal as before described, the operation continuing until the train reaches the crossing and depresses the rail $a$. The movements of said rail causes the rewinding of the motor spring as described, and in so doing the first downward movement of the pawl-plate 29 pulls down the rod 80 which actuates the lift-bar 77 to raise the drop-lever 65, release the detent-bar from semi-raised position, permit the return of the stop-arm to normal position and thus stop the action of the signal, as before described in connection with the operation of the timing or motor-controlled signal-stopping mechanism. Similarly, a train moving on track B toward the signal causes an impulse from the track instrument B' to be sent to the release-magnet 61' over the wires B''. The armature 60' being raised, the drop-lever 65' falls and causes the detent-bar to remain in semi-raised position, so that the signal mechanism continues to operate until the train reaches the crossing and depresses the rail $b$. Then the movement of said rail pulls the rod 80' downward, said rod actuates the lift-bar 77', the movement thereof lifts the drop-lever 65' and the signal mechanism is stopped as before. If, after the operation of the signal has been started by a train on one of the tracks and before said train has reached the crossing a train approaches the crossing on the other track, the effect of the second train passing the respective track-instrument will be to lift the respective release-magnet armature. By the lifting of said armature the second drop-lever will be permitted to fall to its lower position, and the detent-bar will be again fully raised so as to disengage the lug 64 from the finger 54' and permit the stop-arm to return momentarily to the motor-stopping position. In so doing it will raise the pawl 74 out of engagement with the rack-bar 69 so that the rack-bar will be reset or drop to its normal position in engagement with the screw 72. The stop-arm will be returned to signal releasing position by the first one of the rollers 51 which passes the stop-block. Then for a time, or until one of the trains has reached the crossing, both drop-levers will be in their lower positions and both will hold the detent-bar in semi-raised position to retain the stop-arm in signal-releasing position. When one train reaches the crossing the one drop-lever will be restored to normal position, but the signal mechanism will not be stopped thereby because the detent-bar will still be held in semi-raised position by the second drop-lever. However, when the other train reaches the crossing the second drop-lever will be reset and thereupon the operation of the signal will be stopped.

Where the signal mechanism is to be controlled by the trains moving on a single track the control mechanism may be somewhat simplified. Referring to Fig. 13 it will be seen that the extending finger 63 and lug 64 are omitted from the detent-bar 56, and a single drop-lever 165 is employed. The form of the drop-lever is modified, the upwardly extending finger being omitted and a shoulder being formed on the lower side of the lever, beyond which a nose-portion 165$^a$ extends out and normally rests on a pin 94. The stop-arm has a pin 95 extending from the inner side thereof beneath the drop-lever. When one of the release-magnet armatures is raised to lift the detent-bar, the stop-arm is released and swings to the signal-releasing position. During said movement of the stop-arm the pin 95 thereon raises the drop-lever as shown by dotted lines in Fig. 16, and at the conclusion of the movement the shoulder of the drop-lever falls behind the said pin 95. The stop-arm is thus retained at the signal-releasing position until such time as the drop-lever may be lifted to free the same therefrom. The train-controlled means for lifting the drop-lever and stopping the signal, comprise the lifting-bar 77 and rod 80, as in the double-track instrument. The timing or motor-controlled means for lifting the drop-lever are also essentially the same as in the double-track instrument, the rod 76 carried by the rack-bar being formed so as to engage the nose-portion 165ª of the drop-lever and to raise the same after the rack-bar has been sufficiently lifted.

In certain classes of train service, especially on interurban rapid-transit lines, trains sometimes follow each other so closely that the time elapsing from when one train passes a certain point until the following train reaches the same point may be only a few seconds. Where my signal mechanism is used for this class of service I provide certain special mechanism, designated as the lockout device, which serves to prevent such an action of the signal mechanism as the following: Two trains approach the signal on the same track and from the same direction, the one train following the other at a time interval such that before the first train passes the crossing at which the signal mechanism is located the second train will have passed the track instrument which controls the starting of the signal mechanism. Under the conditions stated the signal mechanism would be started by the first train passing over the track instrument. When the second train passed the track instrument an impulse would be sent therefrom to the releasing-magnet but, with the mechanism before described, no further action would take place at the signal mechanism because the same would already be in operation and the stop-arm held in signal-releasing position. Then when the first train passed the crossing the action of the signal mechanism would be stopped and the second train would be approaching the crossing without the signal mechanism being in operation.

In the construction of the lockout device there is added to the mechanism before described a triple-armed lever which is pivoted on the frame as shown in Figs. 13 to 20, inclusive. A small rod 96 is pivotally connected with the detent-bar at the hooked end thereof and extends downwardly therefrom, passing slidably through a guide-block 97 and having the lower end thereof beveled as shown. The upper arm 98 of the lockout-lever has a portion 98' adapted to pass under the guide-block 97 and engage the beveled end of the rod 96, and another portion 98'' adapted to strike against the side of the guide-block to limit the downward swinging movement of the lever. The lower arm 99 of the lockout-lever extends adjacent to the inner side of the stop-arm and, when the parts are in the position shown in Fig. 13, a pin 100 on the stop-arm extends under the said lower arm of the lockout-lever. The lift-arm 101 of the lockout-lever is engageable by a latch 102 which is pivotally connected with the rod 76. Several holes 103 are provided in said rod through which the pivot-pin of the latch may be passed, thus enabling the latch to be placed at different positions on the rod. The lower arm 99 of the lockout-lever is bent out laterally as shown in Fig. 20 so that it will not interfere with the latch, and the length of the pin 100 on the stop-arm is such that it will swing past the latch and the rod 76 without touching them.

The operation of the lockout mechanism may now be understood. The normal position of the parts is shown in Fig. 13. When a train passes the track instrument, energizes one of the release-magnets and lifts the detent-bar to start the operation of the signal mechanism, the lifting of the detent-bar raises the rod 96 so that the lower end thereof is disengaged from the portion 98' of the upper arm of the lockout-lever. Then when the stop-arm has swung to signal-releasing position the lockout-lever drops down to the position shown in Fig. 16, at which the portion 98'' of the upper arm engages the guide-block 97 and the end of the lower arm 99 lies in such a position that it will be engaged by the pin 100 if the stop-arm is moved toward normal position and will prevent the stop-arm reaching the full normal position at which its upper end is engaged and held by the hook 55 of the detent-bar. After the operation of the signal mechanism commences the rack-bar is gradually raised and after a short time the latch 102 engages the lift-arm 101 of the lockout-lever and raises the same so that it is reset or restored to its original or normal position, the rod 96 dropping down in front of the portion 98' to retain it in said position, and the latch 102 passing on up above the lift arm 101, as shown in Fig. 17. Then, if a sufficient time elapses before the train reaches the crossing, the continued upward movement of the rack-bar will lift the drop-lever and free the stop-arm from signal-releasing position, the parts will all return to normal position and the operation of the signal will cease. Similarly, if the train reaches the crossing within a normal time, the drop-lever will be lifted by the movement of the rod 80 and lift-bar 77. If, however, a second train passes the track instrument after the latch has passed above the arm 101, as shown in Fig. 17, and before the mechanism has been reset to normal position either by the timing or the train-controlled signal-stopping mechanism, then the result of the second lifting of the detent-bar will be to release the lockout-lever again. Said lever will then drop to the lower position, as shown in Fig. 18, but this time the latch 102 will be above the lift-arm 101 instead of below it as it was in the first instance, or when the parts were in the positions shown in Fig. 16. The parts being in the said positions shown in Fig. 18, when the first train reaches the crossing the drop-lever will be raised, as indicated by the dotted lines in Fig. 19, but as the stop-arm swings toward normal position the pin 100 will strike the end of the arm 99 of the lock-out lever and will prevent the upper end of the stop-arm from moving back far enough to be engaged and held by the hook of the detent-bar, so that after the lifting of the drop-lever all the parts will be in the positions shown in said Fig. 19. Then when the roller 51 next engages the stop-block the stop-arm will be reset to signal-releasing position, as shown in Fig. 16, so that the operation of the mechanism will continue. The movement of the stop-arm toward normal position, or to the lockout position described, raises the pawl 74 out of engagement with the rack-bar so that the latter will drop to its initial or normal position, as shown in Fig. 19. Thus when the stop-arm is returned to signal-releasing position the rack-bar will again begin its upward movement, the parts all being again in the positions shown in Fig. 16, so that any further operations will be as before described and will depend upon the several conditions of train movement set forth.

The construction and operation of the lockout device has been described as applied to the single-track instrument, on account of the greater simplicity of the ordinary control-mechanism of said instrument. The application of the lockout device to the double-track instrument will now be apparent by reference to Figs. 14 and 15, the first of which shows the normal positions of the parts and the second shows the positions thereof after the first releasing of the stop-arm and the resetting of the lockout-lever by the lifting action of the latch 102. It will be apparent that, when the parts are in the latter position, a second raising of the detent-bar will again release the lockout-lever which will drop to the lower or lock-out position and prevent the return of the stop-arm to full normal position until the rack-bar has been dropped and again moved up to reset the lockout-lever to normal position, the operation being substantially the same as with the single-track instrument. It will also be obvious that the action of the lockout device will be the same no matter which of the drop-levers is involved in the retaining of the stop-arm at release position. There is one slight difference between the operations of the single-track instrument and the double-track instrument with reference to the lockout device. It will be remembered that in the single-track instrument the movement of the stop-arm to the lockout position shown in Fig. 19 occurs when the first train passes the crossing. With the double-track instrument, however, when the detent-bar is raised a second time, to again drop the lockout-lever to the lower position, the stop-arm will at once move to the lockout position, since it will be momentarily freed from the lug 64 by the full raising of the detent-bar. The movement of the stop-arm to lockout position will, of course, disengage the pawl 74 from the rack-bar so that the same will drop down to its initial or normal position and, upon the return of the stop devices to release position, the rack-bar will again move upward and reset the lockout-lever to normal position. Briefly stated, in the single-track instrument the stop moves to lockout position when the first train passes the crossing, and in the double-track instrument the stop moves to lockout position when the second train passes the track instrument. In actual practice the difference in time of the two operations would amount to very little, since the first train would usually pass the crossing within a very short time after the second train passed the track instrument.

Now, having described my invention, what I claim and desire to secure by Letters Patent is:

1. In a railway signaling mechanism, a spring motor, train-actuated means for winding the motor spring, a signal actuating wheel driven by the motor, a stop for said wheel, said stop being normally at a position to prevent movement of the wheel but being movable to a release position, means for holding the stop at normal position, means for moving said holding means to release the stop therefrom, means for retaining the stop in release position, and means controlled by the winding means for moving said retaining means to free the stop therefrom.

2. In a mechanism of the class described, a motor-driven wheel, signal mechanism actuated by said wheel, a stop normally positioned so as to prevent movement of the wheel but movable to a release position, means for holding the stop at normal position, train-controlled means for moving said holding means to release the stop therefrom, means for retaining the stop at release position, and means for moving said retaining means to free the stop therefrom.

3. In a mechanism of the class described, a motor-driven wheel, a stop normally positioned to prevent movement of the wheel but movable to a release position by pressure of the wheel thereon, means for holding the stop at normal position, train-controlled means for moving said holding means to release the stop therefrom, means for retaining the stop at release position, and means for disengaging said retaining means from the stop.

4. In a mechanism of the class described, a motor-driven signal-actuating wheel, a movable stop-device engageable with the wheel, means for holding the stop-device in position to prevent movement of the wheel, the stop-device normally tending to move toward such position but being movable to a release position by pressure of the wheel thereon, train-controlled means for moving the stop-holding means to release the stop therefrom, means for retaining the stop-device in release position, and motor-actuated means for disengaging said retaining means from the stop.

5. In a mechanism of the class described, a motor-driven signal-actuating wheel, a movable stop, means for holding the stop in a normal position to prevent movement of the wheel, the stop having a bias toward such position but being movable to a release position by pressure of the wheel thereagainst, means for moving the stop-holding means to release the stop therefrom, means for retaining the stop in release position, and train-controlled means for disengaging said retaining means from the stop.

6. In a mechanism of the class described, a motor-driven signal-actuating wheel, a movable stop, means for holding the stop in a position to prevent movement of the wheel, the stop having a bias toward such position but being movable to a release position, means for moving the stop-holding means to release the stop therefrom, means for retaining the stop in release position, train-controlled means for disengaging said retaining means from the stop, and motor-controlled means for disengaging said retaining means from the stop.

7. In a mechanism of the class described, a motor-driven signal-actuating wheel, a movable stop normally tending to move to a position at which it may prevent movement of the wheel, means for holding the stop in said position, train-controlled means for moving said holding means to release the stop therefrom, the stop when released being movable by the wheel to a release position, means for retaining the stop at release position, and means for disengaging said retaining means from the stop after the wheel has been in motion for a predetermined time.

8. In a mechanism of the class described, a motor-driven signal-actuating wheel, a movable stop normally tending to move to a position at which it may prevent movement of the wheel, means for holding the stop in said position, means for moving said holding means to release the stop therefrom, the stop when released being movable by the wheel to a release position, means for retaining the stop at release position, train- actuated means for disengaging said retaining means from the stop, and a timing device for disengaging said retaining means from the stop when said retaining means are not first disengaged by the train-actuated means.

9. In a mechanism of the class described, a motor-driven signal-actuating wheel, a movable stop normally tending to move to a position at which it may prevent movement of the wheel, means for holding the stop in said position, means for moving said holding means to release the stop therefrom, the stop when released being movable by the wheel to a release position, means for retaining the stop at release position, train-actuated means for disengaging said retaining means from the stop, a timing device for disengaging said retaining means from the stop, the timing device being movable from a normal position by movement of the wheel, and means for resetting the timing device to normal position by movement of the stop to normal position.

10. In a mechanism of the class described, a motor-driven signal-actuating wheel, a stop adapted when held at normal position to prevent movement of the wheel, a detent for holding the stop at normal position, means for moving the detent to release the stop therefrom, means for retaining the stop at a release position, a lockout device tending to move to a position at which it will prevent movement of the stop to full normal position, the lockout device having a normal position at which it will not interfere with the stop, means for holding the lockout device at said normal position, means actuated by the detent-moving means for moving said lockout-holding means to release the lockout device, a timing device, means actuated thereby for resetting the lockout device to normal position, and means actuated by the stop and controlling the timing device.

11. In a mechanism of the class described, a motor-driven signal-actuating wheel, a movable stop engageable by the wheel, the stop having a normal position at which it it may prevent movement of the wheel, and having also a release position and an intermediate lockout position, a detent for holding the stop at normal position, means for retaining the stop at a release position, a lockout-lever having a normal and a release position, said lever at release position limiting movement of the stop toward normal position and stopping same at the intermediate lockout position, means for moving the detent and the holding means for the lockout-lever to release the stop and the lockout-lever therefrom and permit movement of said parts to release positions, means for moving the lockout-lever to normal position after the stop has been in release position for a predetermined time, and train-actuated means for disengaging from the stop the retaining means for holding the stop at release position.

12. In a mechanism of the class described, a motor-driven signal-actuating wheel, a movable stop, a detent-bar adapted to hold the stop at a position at which it will prevent movement of the wheel, train-controlled means for raising the detent-bar to release the stop therefrom, the stop when released being movable by the wheel to a release position, means on the detent-bar for retaining the stop at release position, said means being operative when the detent-bar is in a semi-raised position, and means for holding the detent-bar in a semi-raised position.

13. In a mechanism of the class described, a motor-driven signal-actuating wheel, a movable stop, a detent-bar for holding the stop at a normal position at which it will prevent movement of the wheel, train-controlled means for raising the detent-bar to release the stop therefrom, the stop when released being movable by the wheel to a release position, means on the detent-bar for retaining the stop at release position, said means being operative when the detent-bar is in a semi-raised position, means for holding the detent-bar in a semi-raised position, and means for displacing said holding means to permit the return of the detent-bar and the stop to normal position.

14. In a mechanism of the class described, a motor-driven signal-actuating wheel, a movable stop, a detent-bar for holding the stop at a normal position at which it will prevent movement of the wheel, electromagnets each having an armature for raising the detent-bar to release the stop and permit movement thereof from normal to a release position, the stop when released being movable by the wheel to release position, means on the detent-bar for retaining the stop at release position, said means being operative only when the detent-bar is in a semi-raised position, drop-levers provided for each of the armatures and adapted to retain said armatures in positions at which they will support the detent-bar in semi-raised position, and separate train-controlled means for moving each of the drop-levers to disengage the same from the respective armatures.

15. In a mechanism of the class described, a motor-driven signal-actuating member, a movable stop, a detent-bar for holding the stop at a normal position at which it will prevent movement of the signal-actuating member, train-controlled electromagnets each having an armature for moving the detent-bar to a position at which it will release the stop, the stop when released being movable by the signal-actuating member to a release position, means on the detent-bar for retaining the stop at release position, said means being operative only when the detent-bar is held at an intermediate position, drop-levers provided for each armature and adapted to retain said armatures in positions at which they will each retain the detent-bar in said intermediate position, and a timing device for moving the drop-levers to disengage them from the respective armatures and permit the return of the detent-bar and stop to normal position.

16. In a mechanism of the class described, a motor-driven signal-actuating wheel, a movable stop, a detent-bar for holding the stop at a normal position at which it will prevent movement of the wheel, electromagnets each having an armature for raising the detent-bar to release the stop, the stop when released being movable by the wheel to a release position, means on the detent-bar for retaining the stop at release position, said means being operative only when the detent-bar is in a semi-raised position, drop-levers provided for each of the armatures and adapted to retain the armatures in positions at which they will support the detent-bar in semi-raised position, separate train-controlled means for moving each of the drop-levers to disengage the same from the respective armatures, and a timing device for moving the drop-levers to disengage them from the armatures.

17. In a mechanism of the class described, a motor-driven signal-actuating wheel, a movable stop, a detent-bar for holding the stop at a normal position at which it will prevent movement of the wheel, electromagnets each having an armature for raising the detent-bar to release the stop therefrom, the stop when released being movable by the wheel to a release position, means on the detent-bar for retaining the stop at release position, said means being operative only when the detent-bar is in a semi-raised position, devices for separately retaining each of the armatures in a position at which it will support the detent-bar in semi-raised position, separate train-controlled means for disengaging each of said retaining devices from the respective armatures, a timing device for disengaging the retaining devices from the armatures, and means actuated by the stop for controlling the timing device.

18. In a mechanism of the class described, a motor-driven signal-actuating wheel, a movable stop, means for holding the stop at a normal position at which it will prevent movement of the wheel, train-controlled means for moving the stop-holding means to release the stop therefrom, means for retaining the stop at release position, a timing device for moving said stop-retaining means to free the stop therefrom, and means carried by the stop for controlling the timing device.

19. In a mechanism of the class described, a spring motor, train-actuated means for winding the motor-spring, a signal-actuating wheel driven by the motor, a movable stop, means for holding the stop at a normal position at which it will prevent movement of the wheel, means for moving said holding means to release the stop therefrom, the stop when released being movable by the wheel to a release position, means for retaining the stop in release position, and means frictionally connected with the winding means for moving said retaining means to free the stop therefrom.

20. In a mechanism of the class described, a motor-driven wheel, a movable stop, means for holding the stop at a normal position at which it will prevent movement of the wheel, train-controlled means for moving said holding means to release the stop therefrom, the stop when released being movable by the wheel to a release position, means for retaining the stop at release position, a lockout-lever having a normal position and a release position, means for holding said lever at normal position, means for moving said holding means simultaneously with the stop-holding means, the lockout-lever when released dropping to a position at which it will prevent movement of the stop to normal position, means for raising the lockout-lever to normal position, and means for moving the stop-retaining means to free the stop therefrom and permit movement of the stop from release toward normal position.

21. In a mechanism of the class described, a motor-driven wheel, a stop normally preventing movement of the wheel, means for holding the stop at normal position, train-controlled means for moving said holding means to release the stop therefrom, the stop when released being movable by the wheel to a release position, means for retaining the stop at release position, a rack-bar, means connected with the wheel for intermittently lifting the rack-bar, means for supporting the rack-bar in the successive positions to which it is lifted, means actuated by the rack-bar for moving the stop-retaining means to free the stop therefrom, and means actuated by the stop for controlling the rack-bar supporting means.

In testimony whereof I have hereunto subscribed my name in the presence of two witnesses.

HENRY A. HOESCHEN.

Witnesses:
   D. O. BARNELL,
   J. O. DETWEILER.

Copies of this patent may be obtained for five cents each, by addressing the "Commissioner of Patents, Washington, D. C."